(12) United States Patent
Pettit

(10) Patent No.: US 10,160,294 B1
(45) Date of Patent: Dec. 25, 2018

(54) DASHBOARD-MOUNTED RETRACTABLE SUNSCREEN

(71) Applicant: Traci Pettit, Decatur, TX (US)

(72) Inventor: Traci Pettit, Decatur, TX (US)

(*) Notice: Subject to any disclaimer, the term of this patent is extended or adjusted under 35 U.S.C. 154(b) by 3 days.

(21) Appl. No.: 15/464,448

(22) Filed: Mar. 21, 2017

(51) Int. Cl.
*B60J 1/20* (2006.01)

(52) U.S. Cl.
CPC .......... *B60J 1/2077* (2013.01); *B60J 1/2033* (2013.01); *B60J 1/2047* (2013.01); *B60J 1/2063* (2013.01)

(58) Field of Classification Search
CPC . B60J 1/20; B60J 1/2011; B60J 1/2013; B60J 1/2033; B60J 1/2047; B60J 1/205; B60J 1/2077; B60J 1/2063
USPC .................................................. 296/70, 97.7
See application file for complete search history.

(56) References Cited

U.S. PATENT DOCUMENTS

| | | | |
|---|---|---|---|
| 4,979,775 A * | 12/1990 | Klose | B60J 1/205 296/97.1 |
| D365,075 S | 12/1995 | Hernandez | |
| 5,562,144 A | 10/1996 | Ming-Shun | |
| 5,653,278 A | 8/1997 | Cheng | |
| 5,791,721 A | 8/1998 | Lin | |
| 6,039,107 A * | 3/2000 | Pittard | B60J 1/2063 160/24 |
| 6,460,593 B1 * | 10/2002 | Floyd | B60J 1/205 160/250 |
| 7,114,759 B1 * | 10/2006 | Chen | B60J 1/2091 296/97.2 |
| 7,143,805 B1 * | 12/2006 | Weir | B60J 1/2063 160/370.22 |
| 7,216,917 B2 | 5/2007 | Tadakamalla | |
| 8,469,077 B1 | 6/2013 | Allard | |
| 2006/0162878 A1 * | 7/2006 | Lin | B60J 1/2033 160/370.22 |
| 2010/0013262 A1 * | 1/2010 | Shu | B60J 1/2038 296/97.8 |
| 2013/0113234 A1 | 5/2013 | Horowitz | |

* cited by examiner

Primary Examiner — Jason S Daniels
(74) Attorney, Agent, or Firm — Kyle A. Fletcher, Esq.

(57) ABSTRACT

The dashboard-mounted retractable sunscreen is a sunscreen that may be deployed from a housing mounted in the area of a vehicle dashboard. To deploy the sunscreen, a shade is pulled from within the housing by grasping a hook on the top of the shade and pulling up. The same hook is used to hold the shade in place by passing the hook over the vehicle's rearview mirror. When no longer needed, the shade may be easily retracted back into the housing by separating the hook from the rearview mirror and lowering the hook towards the housing. Springs in each side of the housing enable the shade to wrap itself around a central rod within the housing. Width adjustment knobs on each end of the housing help hold the housing in place by pressing against the vehicle's left and right 'A' pillars.

17 Claims, 5 Drawing Sheets

DASHBOARD-MOUNTED RETRACTABLE SUNSCREEN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular sunscreens, more specifically, a retractable vehicular sunscreen that mounts in the area of a vehicle dashboard.

SUMMARY OF INVENTION

The dashboard-mounted retractable sunscreen is a sunscreen that may be deployed from a housing mounted in the area of a vehicle dashboard. To deploy the sunscreen, a shade is pulled from within the housing by grasping a hook on the top of the shade and pulling up. The same hook is used to hold the shade in place by passing the hook over the vehicle's rearview mirror. When no longer needed, the shade may be easily retracted back into the housing by separating the hook from the rearview mirror and lowering the hook towards the housing. Springs in each side of the housing cause the shade to wrap itself around a central rod in the housing. Width adjustment knobs on each end of the housing help hold the housing in place by pressing against the vehicle's left and right 'A' pillars.

An object of the invention is to provide shade to the interior of a vehicle by substantially covering the windshield with an opaque sunscreen.

A further object of the invention is to provide a sunscreen that may be easily deployed for use when needed and which may be easily retracted when no longer needed.

Yet another object of the invention is to allow the sunscreen to be held in place by a combination of suction cups and width adjustment knobs at the bottom of the sunscreen and by a hook that passes over the rearview mirror at the top of the sunscreen.

These together with additional objects, features and advantages of the dashboard-mounted retractable sunscreen will be readily apparent to those of ordinary skill in the art upon reading the following detailed description of the presently preferred, but nonetheless illustrative, embodiments when taken in conjunction with the accompanying drawings.

In this respect, before explaining the current embodiments of the dashboard-mounted retractable sunscreen in detail, it is to be understood that the dashboard-mounted retractable sunscreen is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dashboard-mounted retractable sunscreen.

It is therefore important that the claims be regarded as including such equivalent construction insofar as they do not depart from the spirit and scope of the dashboard-mounted retractable sunscreen. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
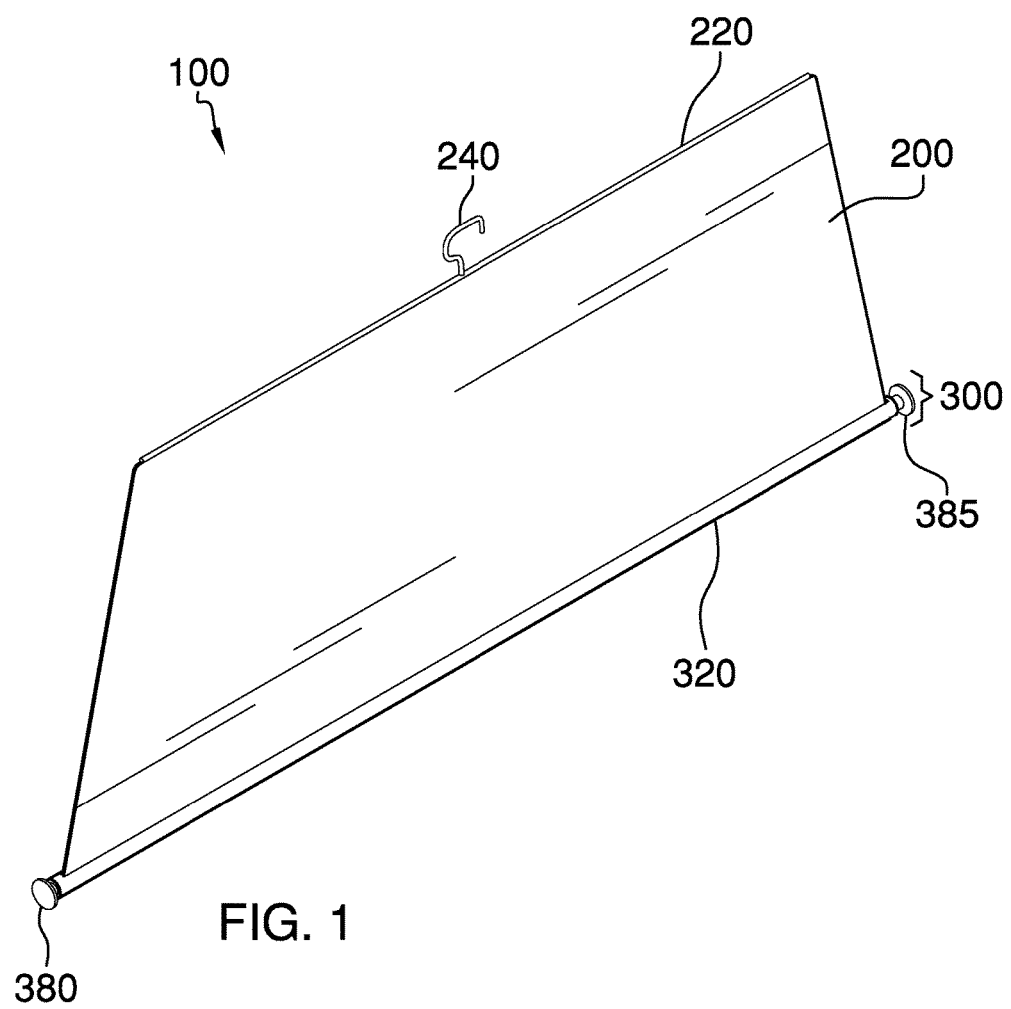
FIG. 1 is a perspective view of an embodiment of the disclosure.
Figure 2:
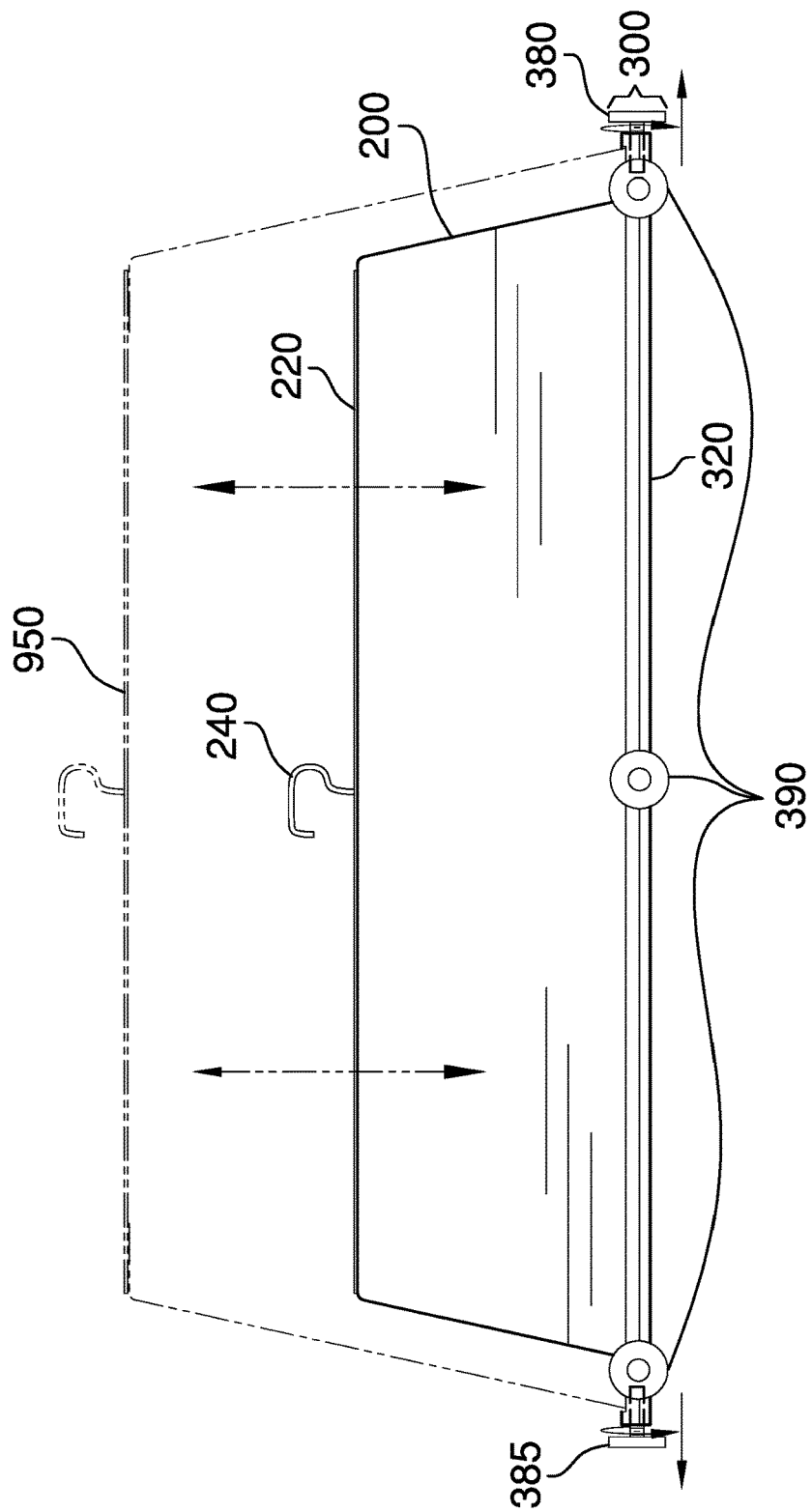
FIG. 2 is a rear view of an embodiment of the disclosure.
Figure 3:
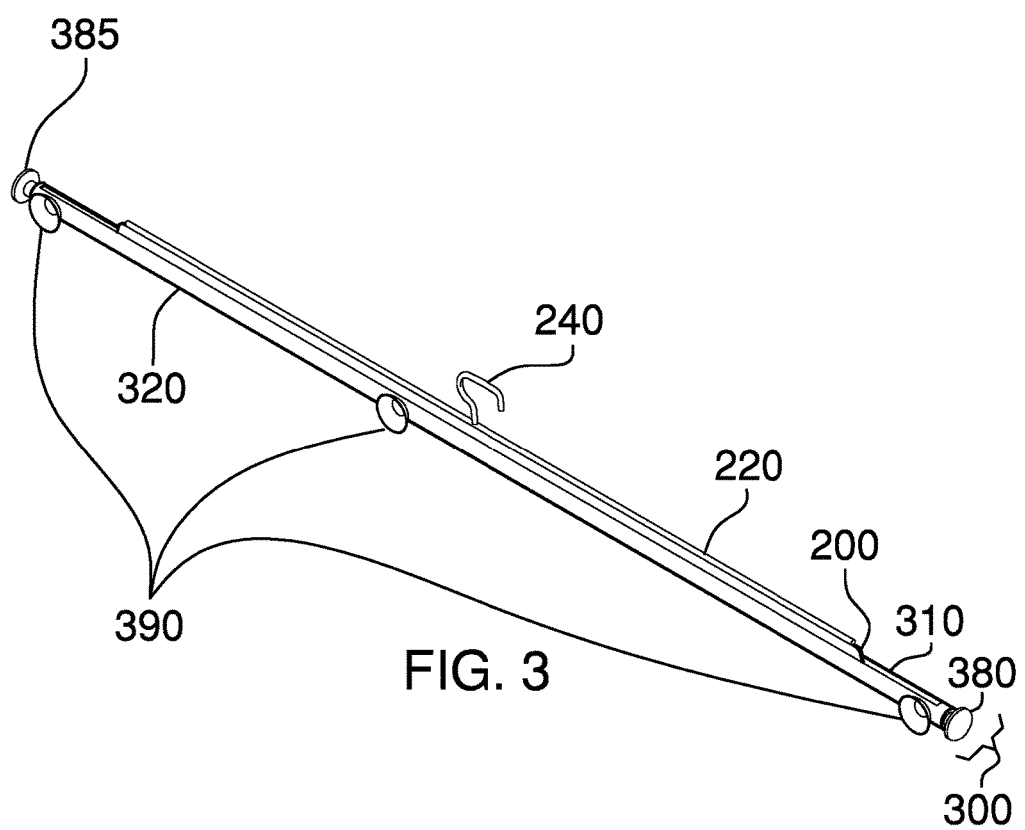
FIG. 3 is a rear view of an embodiment of the disclosure when the sunshade is fully retracted.
Figure 4:
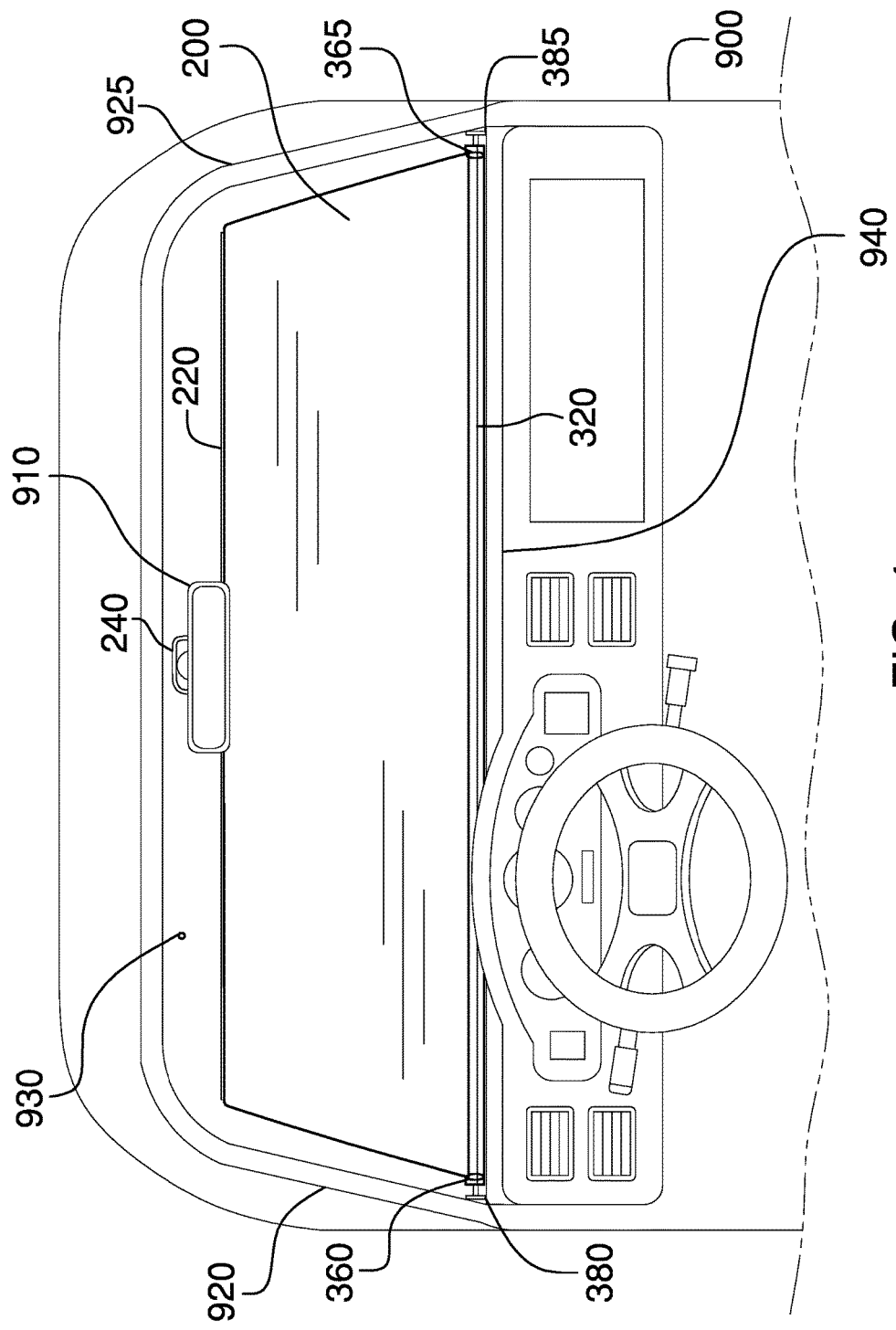
FIG. 4 is a front view of an embodiment of the disclosure while fully deployed and being used to shade the interior of the vehicle.
Figure 5:
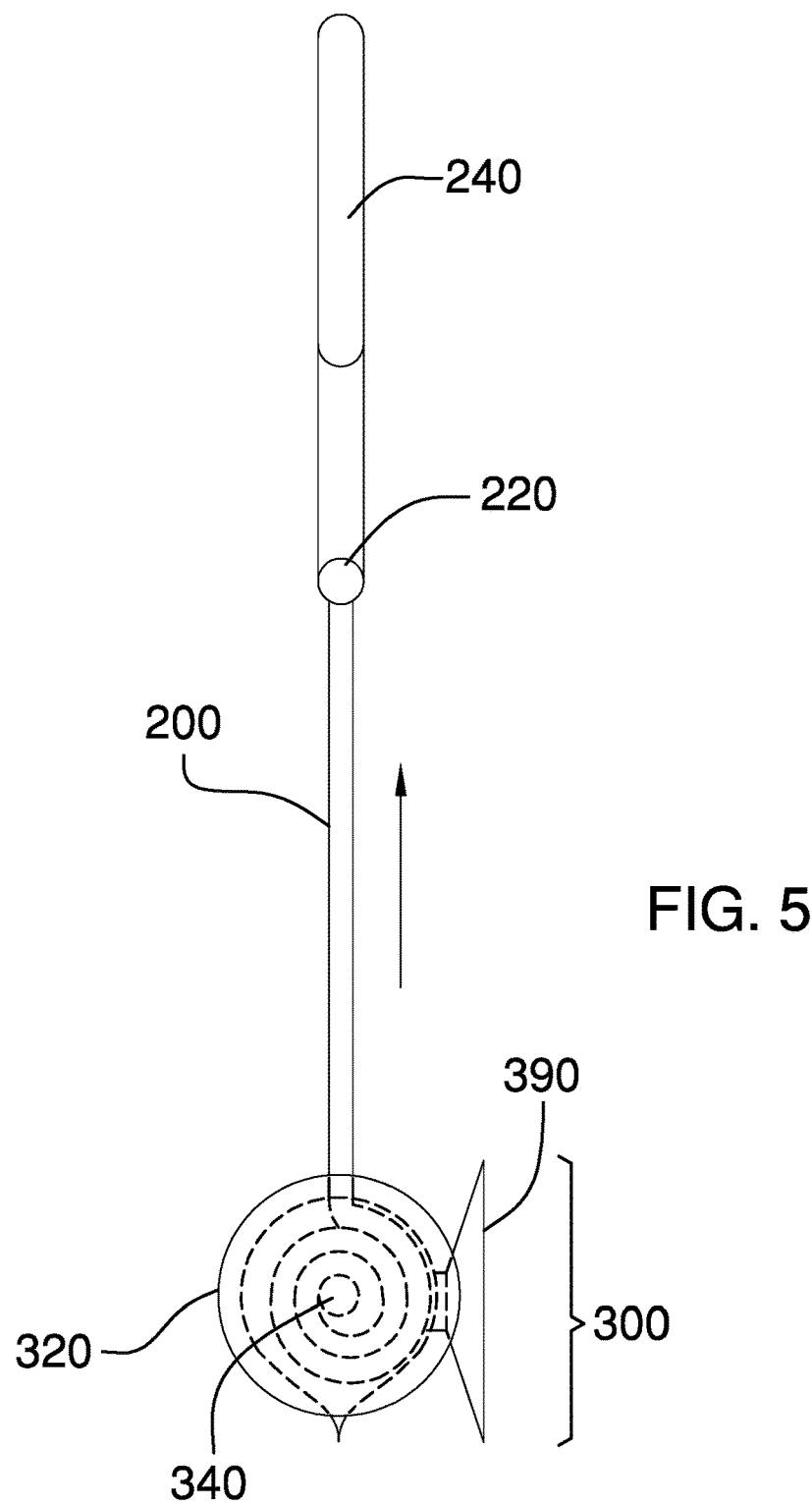
FIG. 5 is a side view of an embodiment of the disclosure.

Detailed reference will now be made to a first potential embodiment of the disclosure, which is illustrated in FIGS. 1 through 5.

The dashboard-mounted retractable sunscreen 100 (hereinafter invention) comprises a roller subassembly 300, a sunshade 200, a top rod 220 and a hook 240. The dashboard-mounted retractable sunscreen 100 provides shade for the interior of a vehicle 900. It mounts inside the vehicle 900 by attaching the roller subassembly 300 to the interior of a windshield 930 at the bottom of the windshield 930 between a left 'A' pillar 920 of the vehicle 900 and a right 'A' pillar 925 of the vehicle 900. To create shade within the vehicle 900, the sunshade 200 is then pulled up from within the roller subassembly 300 using the hook 240. The hook 240 is then passed over the top of a rearview mirror 910 to keep the sunshade 200 in a deployed position 950.

The roller subassembly 300 comprises a housing 320, a bottom rod 340, a left roller spring 360, a right roller spring 365, a left width adjustment 380, a right width adjustment 385 and one or more suction cups 390. The roller subassembly 300 houses the sunshade 200 when the sunshade 200 is not in use. The bottom rod 340 runs longitudinally through the housing 320. The sunshade 200 wraps around the bottom rod 340. The roller subassembly 300 provides attachment points to keep the dashboard-mounted retractable sunscreen 100 in place when installed in the vehicle 900. Specifically, the one or more suction cups 390 hold the roller subassembly 300 against the windshield 930, the left width adjustment 380 may be extended to press against the left 'A' pillar 920 of the vehicle 900, and the right width adjustment 385 may be extended to press against the right 'A' pillar 925 of the vehicle 900.

The housing 320 is an enclosure for the sunshade 200 when the sunshade 200 is not in the deployed position 950. It protects the sunshade 200 from damage and presents an improved appearance for the dashboard-mounted retractable sunscreen 100. The housing 320 is essentially a tube with a longitudinal slot 310 and capped ends. The longitudinal slot 310 allows the sunshade 200 to pass from the bottom rod 340, which is located within the housing 320 to the exterior of the housing 320 where it may then be pulled towards the rearview mirror 910. The housing 320 provides attachment points for mounting the dashboard-mounted retractable sunscreen 100 in the vehicle 900. Specifically, the one or more suction cups 390 are attached to the housing 320, the left end of the housing 320 comprises a threaded hole which is where the left width adjustment 380 attaches, and the right end of the housing 320 comprises a threaded hole which is where the right width adjustment 385 attaches.

The bottom rod 340 is an armature, which the lower edge of the sunshade 200 is attached to. The bottom rod 340 is located within the housing 320 where it runs longitudinally along a central axis of the housing 320 from the left end of the housing 320 to the right end of the housing 320. The bottom rod 340 is coupled to the left roller spring 360 and to the right roller spring 365 and the bottom rod 340 rotates longitudinally under the influence of the left roller spring 360 and the right roller spring 365. As the bottom rod 340 rotates, it pulls the sunshade 200 into the housing 320 and wraps the sunshade 200 around the bottom rod 340. The sunshade 200 may wrap entirely around the bottom rod 340 except for the small portion of the sunshade 200 leading to the top rod 220 which must always remain outside of the housing 320. Under the influence of an external force, such as a user pulling on the hook 240, the bottom rod 340 may counter-rotate and allow the sunshade 200 to unwrap from around the bottom rod 340.

The left roller spring 360 is a coil spring located within the housing 320 and used to cause rotation of the bottom rod 340. An outer end of the left roller spring 360 is mounted to the interior of the housing 320 on the left side of the housing 320. An inner end of the left roller spring 360 is mounted to the left end of the bottom rod 340. The right roller spring 365 is a coil spring located within the housing 320 and used to cause rotation of the bottom rod 340. An outer end of the right roller spring 365 is mounted to the interior of the housing 320 on the right side of the housing 320. An inner end of the right roller spring 365 is mounted to the right end of the bottom rod 340. The left roller spring 360, in conjunction with the right roller spring 365, places a torque on the bottom rod 340 relative to the housing 320, which has the effect of causing the bottom rod 340 to rotate in a direction that pulls the sunshade 200 into the housing 320. The left roller spring 360 and the right roller spring 365 are oriented such that they rotate the bottom rod 340 in the same direction.

The left width adjustment 380 comprises a flattened knob mounted onto a threaded shaft. The threaded shaft of the left width adjustment 380 screws into a threaded hole on the left side of the housing 320. By turning the left width adjustment 380 clockwise as seen from the left end of the housing 320, the knob on the left width adjustment 380 will move into the housing 320. By turning the left width adjustment 380 counter-clockwise, the knob on the left width adjustment 380 will move away from the housing 320. Turning the left width adjustment 380 counter-clockwise has the effect of increasing the overall width of the roller subassembly 300. Turning the left width adjustment 380 clockwise has the effect of decreasing the overall width of the roller subassembly 300.

The right width adjustment 385 comprises a flattened knob mounted onto a threaded shaft. The threaded shaft of the right width adjustment 385 screws into a threaded hole on the right side of the housing 320. By turning the right width adjustment 385 clockwise as seen from the right end of the housing 320, the knob on the right width adjustment 385 will move into the housing 320. By turning the right width adjustment 385 counter-clockwise, the knob on the right width adjustment 385 will move away from the housing 320. Turning the right width adjustment 385 counter-clockwise has the effect of increasing the overall width of the roller subassembly 300. Turning the right width adjustment 385 clockwise has the effect of decreasing the overall width of the roller subassembly 300. The left width adjustment 380 and the right width adjustment 385 can be used together to wedge the roller subassembly 300 between the left 'A' pillar 920 and the right 'A' pillar 925 and to keep it centered. In some embodiments, the flattened knob on the left width adjustment 380 and the flattened knob on the right width adjustment 385 may be textured to enhance their ability to stay in place when pressed against the left 'A' pillar 920 and the right 'A' pillar 925. In some embodiments, the flattened knob on the left width adjustment 380 and the flattened knob on the right width adjustment 385 may be padded to enhance their ability to stay in place when pressed against the left 'A' pillar 920 and the right 'A' pillar 925.

The one or more suction cups 390 are mounted to the roller subassembly 300 in a straight line on the windshield 930 side of the housing 320 where they may adhere to the windshield 930 and help retain the dashboard-mounted retractable sunscreen 100 in place. The placement of the one or more suction cups 390 is such that when the one or more suction cups 390 are positioned on the windshield 930 side of the roller subassembly 300, the longitudinal slot 310 of the roller subassembly 300 is directly on top. The quantity and spacing of the one or more suction cups 390 may vary based upon specific measurement of the vehicle 900 that the dashboard-mounted retractable sunscreen 100 is intended to fit.

The sunshade 200 comprises a flexible, opaque material intended to prevent sunlight from passing through it. The sunshade 200 is shaped to substantially cover the windshield 930 of the vehicle 900. Substantially covering the windshield 930 is intended to mean that greater than 75% of the windshield 930 is covered by the sunshade 200. The bottom of the sunshade 200 is attached to the bottom rod 340 within the housing 320 and the sunshade 200 wraps around the bottom rod 340 within the housing 320 when not in use. The top of the sunshade 200 is attached to the top rod 220. The specific size and shape of the sunshade 200 will vary from embodiment to embodiment based upon the size and shape of the windshield 930 of the vehicle 900 that the dashboard-mounted retractable sunscreen 100 is intended to fit. In general, the sunshade 200 will be a trapezoidal shape. The top of the sunshade 200, and thus the top rod 220, is parallel to the bottom of the sunshade 200, and thus parallel to the bottom rod 340. The bottom of the sunshade 200 is wider than the top of the sunshade 200 because, in general, the windshield 930 is wider at the bottom than at the top. In some embodiments, the sunshade 200 may present a reflective surface on the windshield 930 side of the sunshade 200.

The top rod 220 is an armature that is attached to the top of the sunshade 200 for the entire length of the top of the sunshade 200. The purpose of the top rod 220 is to provide support for the top of the sunshade 200. The top center of the top rod 220 is attached to the hook 240. In some embodiments, the coupling of the hook 240 to the top rod 220 may be pivoting, thus allowing the hook 240 to rotate with respect to the top rod 220 may allow the hook 240 to attach to the rearview mirror 910 easier.

The hook 240 is a bent metal or plastic armature that allows the rearview mirror 910 to retain the dashboard-mounted retractable sunscreen 100 in the deployed position 950. Specifically, when the sunshade 200 has been pulled out of the housing 320 towards the top of the vehicle 900, the hook 240 may be passed over the rearview mirror 910 to hold the sunshade 200 in that position.

The dashboard-mounted retractable sunscreen 100 is used by placing the roller subassembly 300 on a dashboard 940 of the vehicle 900 with the longitudinal slot 310 facing up and the one or more suction cups 390 between the housing 320 and the windshield 930. The one or more suction cups 390 are dampened and then the roller subassembly 300 is maneuvered so that the one or more suction cups 390 are pressed against the windshield 930. The one or more suction cups 390 may then be pressed against the windshield 930. The left width adjustment 380 and the right width adjustment 385 may be turned counter-clockwise to wedge the roller subassembly 300 between the left 'A' pillar 920 and the right 'A' pillar 925. The user may then extend the sunshade 200 by grasping the hook 240 and pulling it towards the rearview mirror 910. The hook 240 may then be passed over the rearview mirror 910 to retain the sunshade 200 in place. To remove the dashboard-mounted retractable sunscreen 100, the hook 240 is separated from the rearview mirror 910 and the sunshade 200 is allowed to retract into the housing 320 by lowering the hook 240. When the sunshade 200 is completely within the housing 320, the left width adjustment 380 and the right width adjustment 385 may be turned clockwise to reduce the width of the roller subassembly 300. The one or more suction cups 390 may then be separated from the windshield 930 and the dashboard-mounted retractable sunscreen 100 may be removed from the vehicle 900.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A dashboard-mounted retractable sunscreen comprising:
    a roller subassembly, a sunshade, a top rod and a hook;
    wherein the dashboard-mounted retractable sunscreen provides shade for the interior of a vehicle;
    wherein the dashboard-mounted retractable sunscreen mounts inside the vehicle by attaching the roller subassembly to an interior of a windshield at a bottom of the windshield between a left 'A' pillar of the vehicle and a right 'A' pillar of the vehicle;
    wherein the sunshade is pulled up from within the roller subassembly using the hook in order to create shade for the interior of the vehicle;
    wherein the hook is passed over a top of a rearview mirror to keep the sunshade in a deployed position;
    wherein the roller subassembly comprises a housing, a bottom rod, a left roller spring, a right roller spring, a left width adjustment, a right width adjustment and one or more suction cups;
    wherein the roller subassembly houses the sunshade when the sunshade is not in use;
    wherein the bottom rod runs longitudinally through the housing;
    wherein the sunshade wraps around the bottom rod;
    wherein the left width adjustment extends to press against the left 'A' pillar of the vehicle;
    wherein the right width adjustment extends to press against the right 'A' pillar of the vehicle.

2. The dashboard-mounted retractable sunscreen according to claim 1
    wherein the housing is an enclosure for the sunshade when the sunshade is not in the deployed position;
    wherein the housing protects the sunshade from damage and presents an improved appearance for the dashboard-mounted retractable sunscreen;
    wherein the housing is a tube with a longitudinal slot and capped ends;
    wherein the longitudinal slot allows the sunshade to pass from the bottom rod which is located within the housing to the exterior of the housing where it is then pulled towards the rearview mirror;
    wherein the one or more suction cups are attached to the housing;
    wherein the left end of the housing comprises a threaded hole which is where the left width adjustment attaches;
    wherein the right end of the housing comprises a threaded hole which is where the right width adjustment attaches.

3. The dashboard-mounted retractable sunscreen according to claim 2
    wherein the bottom rod is an armature which the lower edge of the sunshade is attached to;
    wherein the bottom rod is located within the housing;
    wherein the bottom rod runs longitudinally along a central axis of the housing from the left end of the housing to the right end of the housing.

4. The dashboard-mounted retractable sunscreen according to claim 3
    wherein the bottom rod is coupled to the left roller spring;
    wherein the bottom rod is coupled to the right roller spring;

wherein the bottom rod rotates longitudinally under the influence of the left roller spring and the right roller spring;

wherein the bottom rod rotates pulls the sunshade into the housing and wraps the sunshade around the bottom rod;

wherein under the influence of an external force the bottom rod counter-rotates and allows the sunshade to unwrap from around the bottom rod.

5. The dashboard-mounted retractable sunscreen according to claim 4 wherein the left roller spring is a coil spring located within the housing;

wherein the left roller spring causes rotation of the bottom rod;

wherein an outer end of the left roller spring is mounted to the interior of the housing on the left side of the housing;

wherein an inner end of the left roller spring is mounted to the left end of the bottom rod.

6. The dashboard-mounted retractable sunscreen according to claim 5 wherein the right roller spring is a coil spring located within the housing;

wherein the right roller spring causes rotation of the bottom rod;

wherein an outer end of the right roller spring is mounted to the interior of the housing on the right side of the housing;

wherein an inner end of the right roller spring is mounted to the right end of the bottom rod.

7. The dashboard-mounted retractable sunscreen according to claim 6 wherein the left roller spring and the right roller spring place a torque on the bottom rod relative to the housing;

wherein the torque has the effect of causing the bottom rod to rotate in a direction that pulls the sunshade into the housing;

wherein the left roller spring and the right roller spring are oriented such that they rotate the bottom rod in the same direction.

8. The dashboard-mounted retractable sunscreen according to claim 7 wherein the left width adjustment comprises a flattened knob mounted onto a threaded shaft;

wherein the threaded shaft of the left width adjustment screws into a threaded hole on the left side of the housing;

wherein by turning the left width adjustment clockwise as seen from the left end of the housing, the knob on the left width adjustment will move into the housing;

wherein by turning the left width adjustment counter-clockwise, the knob on the left width adjustment will move away from the housing;

wherein turning the left width adjustment counter-clockwise has the effect of increasing the overall width of the roller subassembly;

wherein turning the left width adjustment clockwise has the effect of decreasing the overall width of the roller subassembly.

9. The dashboard-mounted retractable sunscreen according to claim 8 wherein the right width adjustment comprises a flattened knob mounted onto a threaded shaft;

wherein the threaded shaft of the right width adjustment screws into a threaded hole on the right side of the housing;

wherein by turning the right width adjustment clockwise as seen from the right end of the housing, the knob on the right width adjustment will move into the housing;

wherein by turning the right width adjustment counter-clockwise, the knob on the right width adjustment will move away from the housing;

wherein turning the right width adjustment counter-clockwise has the effect of increasing the overall width of the roller subassembly;

wherein turning the right width adjustment clockwise has the effect of decreasing the overall width of the roller subassembly.

10. The dashboard-mounted retractable sunscreen according to claim 9 wherein the left width adjustment and the right width adjustment are used to wedge the roller subassembly between the left 'A' pillar and the right 'A' pillar and to keep it centered.

11. The dashboard-mounted retractable sunscreen according to claim 10 wherein the flattened knob on the left width adjustment and the flattened knob on the right width adjustment are textured to enhance their ability to stay in place when pressed against the left 'A' pillar and the right 'A' pillar.

12. The dashboard-mounted retractable sunscreen according to claim 10 wherein the flattened knob on the left width adjustment and the flattened knob on the right width adjustment are padded to enhance their ability to stay in place when pressed against the left 'A' pillar and the right 'A' pillar.

13. The dashboard-mounted retractable sunscreen according to claim 10 wherein the one or more suction cups are mounted to the roller subassembly in a straight line on the windshield side of the housing where they adhere to the windshield and help retain the dashboard-mounted retractable sunscreen in place;

wherein the placement of the one or more suction cups is such that when the one or more suction cups are positioned on the windshield side of the roller subassembly, the longitudinal slot of the roller subassembly is directly on top.

14. The dashboard-mounted retractable sunscreen according to claim 13 wherein the sunshade comprises a flexible, opaque material that prevents sunlight from passing through it;

wherein the sunshade substantially covers the windshield of the vehicle;

wherein the bottom of the sunshade is attached to the bottom rod within the housing;

wherein the sunshade wraps around the bottom rod within the housing when not in use;

wherein the top of the sunshade is attached to the top rod;

wherein the sunshade is a trapezoidal shape;

wherein the top of the sunshade is parallel to the bottom of the sunshade;

wherein the bottom of the sunshade is wider than the top of the sunshade.

15. The dashboard-mounted retractable sunscreen according to claim 14 wherein the top rod is an armature that is attached to the top of the sunshade for the entire length of the top of the sunshade;

wherein the top rod provides support for the top of the sunshade;

wherein the top center of the top rod is attached to the hook.

16. The dashboard-mounted retractable sunscreen according to claim 15
   wherein the hook pivotally couples to the top rod thus allowing the hook to rotate with respect to the top rod.

17. The dashboard-mounted retractable sunscreen according to claim 15
   wherein the hook is a bent armature;
   wherein the hook passes over the rearview mirror to retain the dashboard-mounted retractable sunscreen in the deployed position.

* * * * *